UNITED STATES PATENT OFFICE.

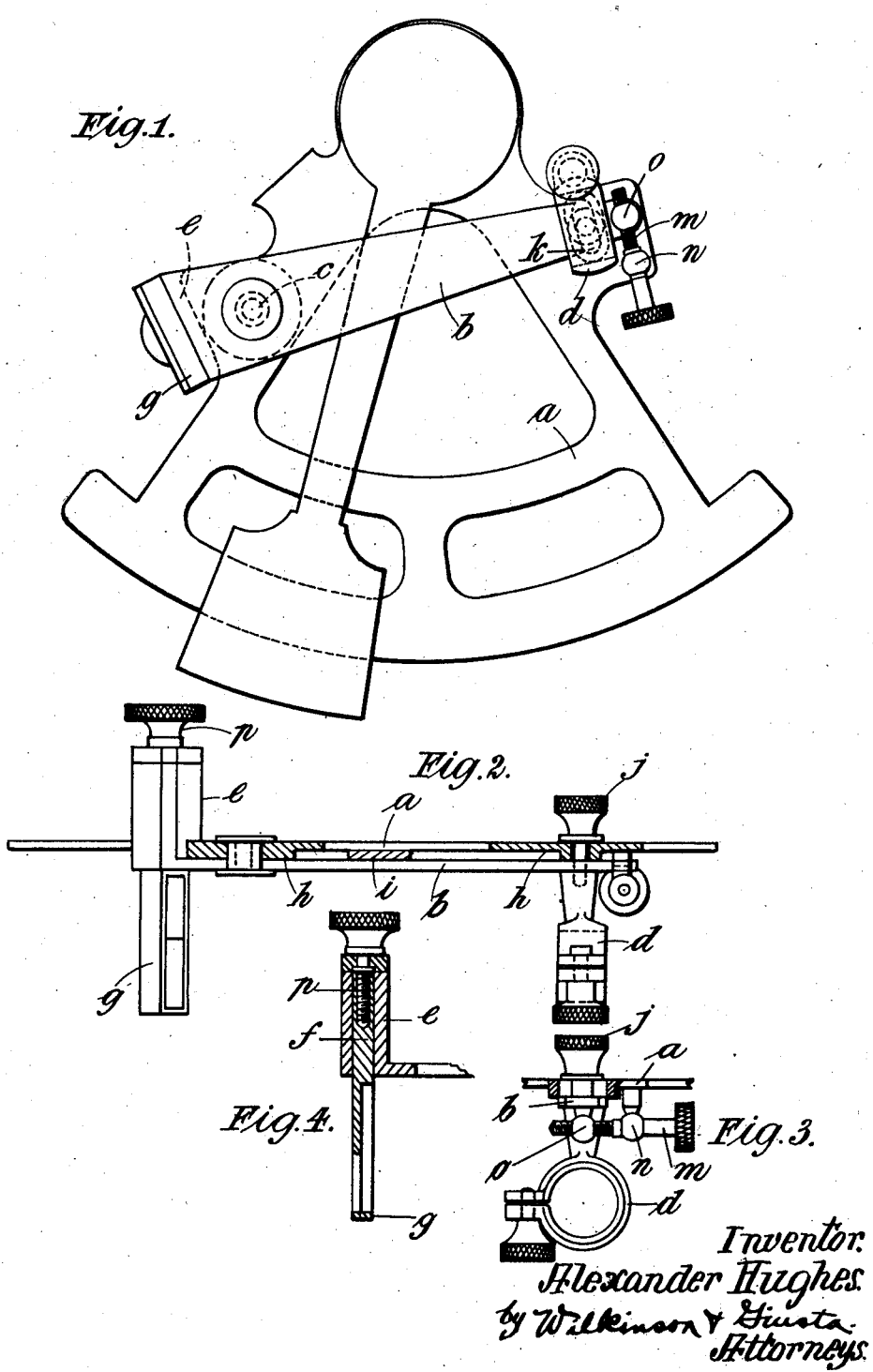

ALEXANDER HUGHES, OF LONDON, ENGLAND, ASSIGNOR TO HENRY HUGHES AND SON, LIMITED, OF LONDON, ENGLAND, A CORPORATION OF GREAT BRITAIN.

SEXTANT.

1,339,342.  Specification of Letters Patent.  Patented May 4, 1920.

Application filed April 19, 1919. Serial No. 291,233.

*To all whom it may concern:*

Be it known that I, ALEXANDER HUGHES, a subject of the King of Great Britain, residing at 59 Fenchurch street, in the city and county of London, England, have invented a new and useful Improvement in Sextants, of which the following is a specification.

This invention relates to improvements in sextants.

Heretofore it has been usual to mount the horizon mirror and telescope or eyepiece separately on the limb of the sextant and to provide each of these parts with means for adjusting their respective positions in order that they may be accurately collimated. This separate mounting of the said parts does not provide a support for the telescope which is sufficiently rigid to maintain the same in accurate alinement or collimation with relation to the horizon mirror, under ordinary conditions of use, and the usual forms of mounting and means of adjustment provided for the horizon mirror are also more or less wanting in rigidity.

According to this invention, a bar is mounted on a pivotal support provided on the sextant limb, and this bar carries near to one end thereof, a tube or holder in which the telescope can be inserted and held. This tube or holder is rigidly connected to the bar by screws, soldering or brazing, and may if desired, be split or sprung so that it can grip the telescope very firmly.

At its opposite end the said bar is provided with a vertical lug or plate in or on which a clip or frame carrying the horizon mirror is slidably mounted and movable, for example, by means of an adjusting screw or lever fitting. The direction of movement of the clip or frame is arranged transversely to the line between the clear and the silvered parts of the horizon glass or mirror.

At a convenient part of the said bar which may be termed the horizon bar, a screw hole is tapped and a corresponding quadrantal slot is formed in the sextant limb, through which passes a set screw to clamp the bar in its required adjustment on the sextant limb after turning it in its pivotal support. The said horizon bar and the index bar of the sextant are arranged in different planes so that each can be moved without interfering with the other.

The usual horizon shades can be attached to the back of the horizon clip and move up and down with it.

It is evident from the above description that this invention provides a truer and more rigid mounting of both the horizon mirror and the sighting telescope in correct alinement with each other, and that the telescope held firmly in the said tube or holder is not liable to be deflected out of collimation with the horizon mirror. The above improved construction moreover admits of better standardization in manufacture and interchangeability of parts.

In the accompanying drawing which shows how the said invention may be conveniently and advantageously carried into practice:—

Figure 1 shows a sextant constructed according to the said invention.

Fig. 2 is an edge view of the horizon bar together with a telescope tube or holder and a mirror clip or frame attached thereto.

Fig. 3 is a detail view of the telescope tube or holder, and

Fig. 4 is a detail sectional view of the mirror clip or frame.

As shown in this drawing $a$ is the sextant limb and $b$ a horizon bar pivotally supported thereon at $c$. $d$ is a telescope tube or holder rigidly fixed to the bar $b$ near one end thereof. At the other end of this bar is a lug $e$ having a guideway $f$ formed therein in which a mirror clip or frame $g$ is slidably mounted. The bar $b$ is held away from the sextant limb by projections $h$ so that an index bar $i$ can move freely between these parts. At a convenient part of the bar $b$ a clamping screw $j$ is provided passing through a slot $k$ in the sextant limb. After the index bar $i$ has been set at zero the bar $b$ can be adjusted to its proper position by observation and then clamped in this position by means of the screw $j$. The adjustment of the bar $b$ may be effected directly by hand, or by means of an adjusting screw $m$ held in a swivel bearing $n$ fixed on the limb $a$ and engaging a swivel nut $o$ fixed on the bar $b$.

The clip or frame $g$ as shown is movable in the guide-way $f$ by means of an adjusting screw $p$, but this clip or frame may be moved by hand and clamped in the position to which it is adjusted by means of a clamping screw moving in a slot in the lug e like the clamping screw j.

With this improved construction a telescope mounted in the tube or holder d is very rigidly supported and kept in alinement with the horizon mirror which is alone adjustable for collimation purposes, and moreover the mirror and telescope thus mounted are simultaneously adjustable with reference to the index mirror, when the latter is in its zero position, by movement of the said horizon bar.

What I claim as my invention and desire to secure by Letters Patent is:—

1. In a sextant, the combination of a bar pivoted to the sextant limb, a frame, a telescope tube rigidly fixed to one end of said bar, a horizon glass comprising clear and silvered parts mounted in said frame at the opposite end of said bar, means for adjusting the said frame in a direction normal to the line between the clear and silvered parts of the horizon glass and to the axis of the telescope tube, and means for effecting a fine adjustment of the bar about its pivotal support.

2. In a sextant, the combination of a bar pivoted to the sextant limb, a telescope tube rigidly fixed to one end of said bar, a frame having a horizon glass mounted therein, and fixed to the opposite end of said bar, means for adjusting the said frame in a direction normal to the axis of the telescope, means for effecting a fine adjustment of the bar about its pivotal support, and separate means for clamping the bar in the position to which it is thus adjusted.

3. In a sextant, the combination of a bar pivoted to the sextant limb, a telescope tube rigidly fixed to the one end of said bar, a frame mounted at the opposite end of said bar and having a horizon glass fitted therein, a lug projecting from said bar and having a guideway formed therein in which the said frame is slidably mounted, and a screw for adjusting the position of the said frame in the said guideway in a direction normal to the axis of the telescope.

4. A sextant comprising a sextant limb, an index bar pivoted to said limb at one part thereof, a horizon bar pivoted to said limb at another part thereof, a telescope tube rigidly fixed to the one end of said horizon bar, a horizon glass at the opposite end of said bar, a frame carrying said horizon glass, and means for adjusting the said frame in a direction normal to the axis of the telescope tube.

5. In a sextant, the combination of a sextant limb, a horizon bar pivoted thereto, an index bar movable between the sextant limb and the horizon bar, a telescope tube rigidly fixed to the said horizon bar at the one end thereof, a horizon glass adjustably mounted on said horizen bar at the opposite end thereof, and means for adjusting the horizon glass in a direction normal to the axis of the telescope tube.

ALEXANDER HUGHES.